UNITED STATES PATENT OFFICE.

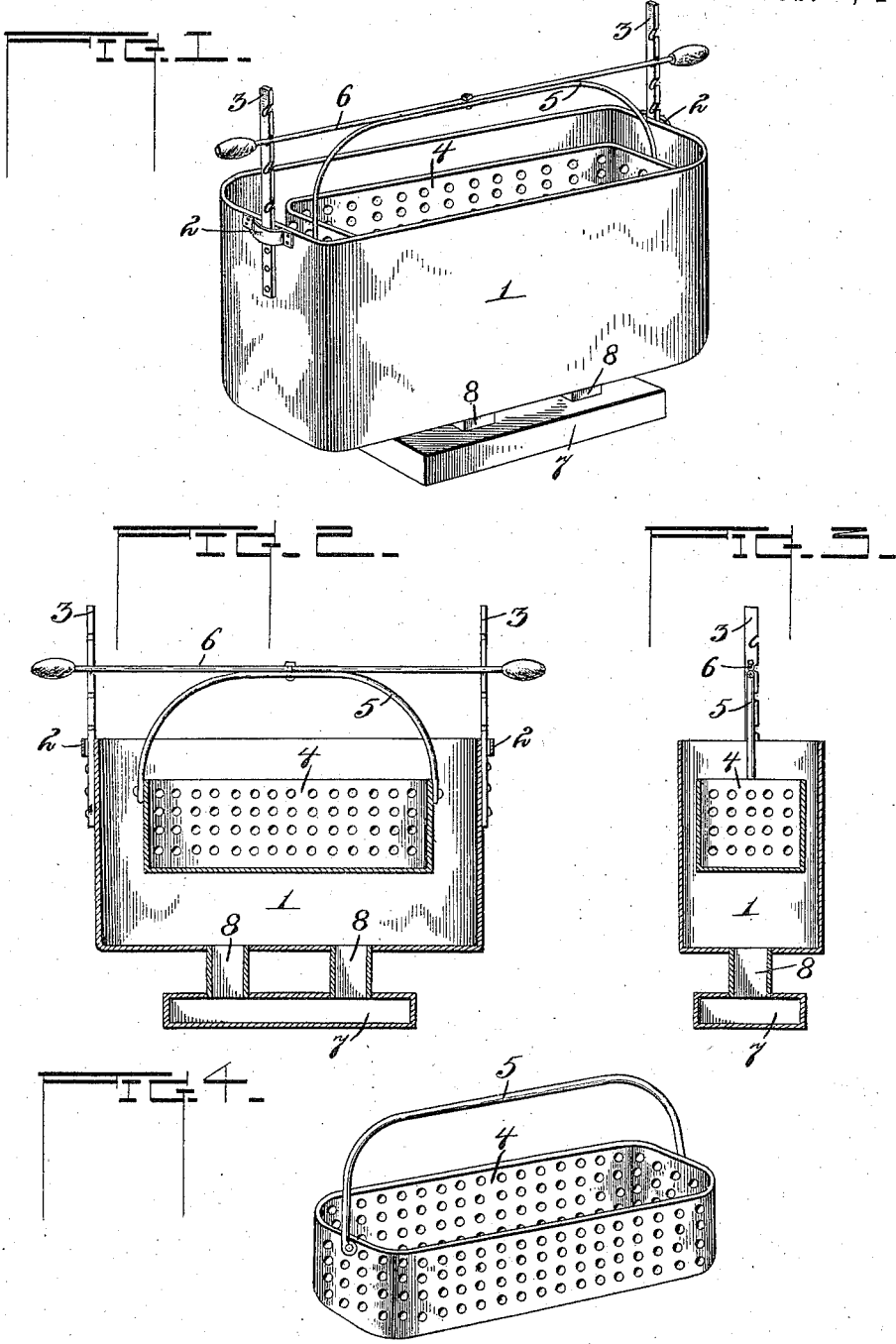

THOMAS H. RANEY, OF RIALTO, NORTH CAROLINA.

STEAMER FOR CANNING FRUITS OR VEGETABLES.

SPECIFICATION forming part of Letters Patent No. 576,226, dated February 2, 1897.

Application filed July 30, 1896. Serial No. 601,085. (No model.)

*To all whom it may concern:*

Be it known that I, THOMAS H. RANEY, a citizen of the United States, residing at Rialto, in the county of Chatham and State of North Carolina, have invented a new and useful Steamer for Canning Fruits or Vegetables, of which the following is a specification.

The invention relates to improvements in steamers for canning fruits and vegetables.

The object of the present invention is to improve the construction of steamers for canning fruits and vegetables, to increase their efficiency, and to prevent the hot water employed for cooking or steaming fruits and vegetables from being materially chilled when the receptacles containing them are introduced into the boiler, and to enable any water reduced in temperature to be rapidly heated to the proper temperature.

The invention consists in the construction and novel combination and arrangement of parts hereinafter fully described, illustrated in the accompanying drawings, and pointed out in the claim hereto appended.

In the drawings, Figure 1 is a perspective view of a steamer constructed in accordance with this invention. Fig. 2 is a longitudinal sectional view of the same. Fig. 3 is a transverse sectional view. Fig. 4 is a detail perspective view of the foraminous basket or tray for holding the cans or other receptacles containing fruit or vegetables to be steamed.

Like numerals of reference designate corresponding parts in all the figures of the drawings.

1 designates a boiler, of any desired configuration, adapted to be placed on a stove or furnace, provided at its ends with handles 2 and having notched bars 3, extending vertically from opposite sides or ends of it and forming an adjustable support for a basket or tray 4. The basket or tray 4, which is designed to receive the receptacles containing the fruit or vegetables to be canned, is foraminous and may be constructed of any suitable material, preferably sheet metal. The basket or tray is provided with an upwardly-extending bail 5, and centrally secured to the same is a horizontal bar 6, which is disposed longitudinally of the boiler when the latter is made oblong and is adapted to engage the notches of the vertical bars or arms 3, whereby the basket or receptacle is adjustably suspended within the boiler. The terminals of the horizontal bar 6 are provided with suitable handles, and they form convenient means for lifting the tray or basket into and out of the boiler. When the boiler is constructed to accommodate a large amount of fruit or vegetables, it is preferably made circular, but when smaller boilers are employed they are preferably made oblong and are of a shape similar to the ordinary washboiler.

It has been found by experience that when fruits or vegetables to be canned are placed into hot water and the latter is chilled to any extent the canning process is not as successful as when the water is prevented from being lowered in temperature and is practically maintained at the same temperature.

In order to heat water rapidly and prevent the contents of the boiler from being lowered materially in temperature when fruit or vegetables to be canned are placed within it, the boiler is provided with a depending receptacle 7, located beneath the bottom of the boiler and designed to extend within a stove or furnace and be subjected directly to the heat. The receptacle 7, which is preferably rectangular, and which is constructed of suitable metal, is connected with the boiler by short tubes 8. It enables water to be rapidly heated, and should any of the water in the boiler become chilled when the fruit and vegetables are introduced into the same hot water from the receptacle 7 will immediately rise and take the place of the water that is reduced in temperature, thereby practically maintaining the water within the boiler at the same temperature and preventing any sudden reduction in the temperature thereof.

It will be seen that the canner is exceedingly simple and inexpensive in construction, that it is easily manipulated, and that it will prevent water in the boiler from being materially reduced in temperature when fruit or vegetables to be canned are introduced into it.

What I claim is—

A device of the class described, comprising a boiler provided with vertical bars extending above it and having series of notches, a basket or receptacle arranged within the boiler and provided with a bail, and a horizontal bar secured to and extending from opposite ends of the bail, engaging the notches of the vertical bars and provided beyond the same with handles, substantially as described.

In testimony that I claim the foregoing as my own I have hereto affixed my signature in the presence of two witnesses.

THOMAS H. RANEY.

Witnesses:
T. A. SPARROW,
H. M. MORRIS.